United States Patent [19]

Choi

[11] Patent Number: 5,347,313
[45] Date of Patent: Sep. 13, 1994

[54] VIDEO SIGNAL COMPENSATION APPARATUS FOR TELEVISION RECEIVER

[75] Inventor: Sung U. Choi, Seoul, Rep. of Korea

[73] Assignee: Goldstart Co., Ltd., Seoul, Rep. of Korea

[21] Appl. No.: 38,614

[22] Filed: Mar. 29, 1993

[30] Foreign Application Priority Data

Mar. 30, 1992 [KR] Rep. of Korea ............... 5240/1992

[51] Int. Cl.$^5$ ............................................. H04N 7/01
[52] U.S. Cl. ............................... 348/445; 348/458
[58] Field of Search .................. 358/140, 230, 11; 348/445, 458; H04N 7/01

[56] References Cited

U.S. PATENT DOCUMENTS

| | | | |
|---|---|---|---|
| 4,984,078 | 1/1991 | Skinner et al. | 358/140 X |
| 5,020,395 | 12/1991 | Kitaura et al. | 358/140 X |
| 5,159,437 | 10/1992 | Lee | 358/11 |
| 5,212,550 | 5/1993 | Park | 358/140 |
| 5,231,490 | 7/1993 | Park | 358/140 |
| 5,243,421 | 9/1993 | Nagata et al. | 358/140 |

Primary Examiner—Victor R. Kostak
Attorney, Agent, or Firm—Birch, Stewart Kolasch & Birch

[57] ABSTRACT

A video signal compensation apparatus for a television receiver which is capable converting a received video signal having a first aspect ratio to a second aspect ratio. The received video signal having the first aspect ratio is written in a memory field-by-field, and the video signal stored in the memory is read line-by-line. The pixel information therein line interpolated and output video signals are generated having a aspect ratio, thereby enabling the received video signal having the first aspect ratio to be displayed on television receiver having the second aspect ratio without distortion.

13 Claims, 9 Drawing Sheets

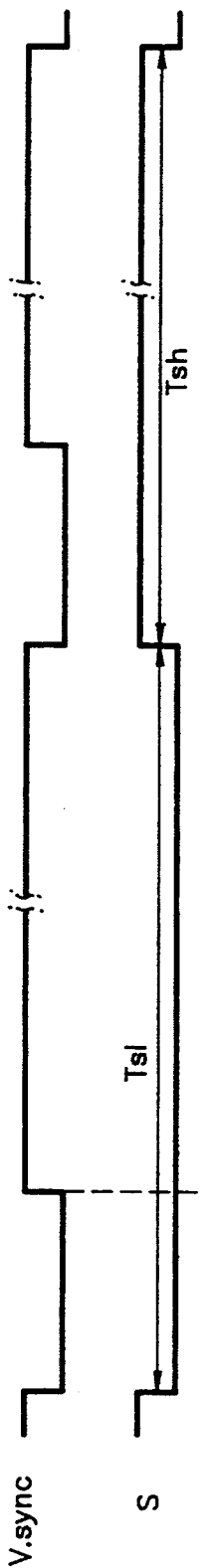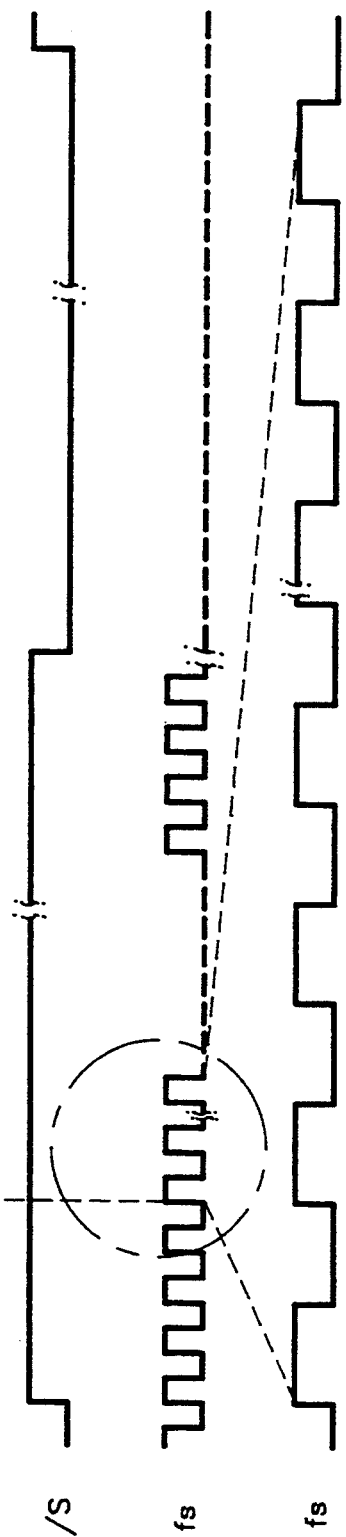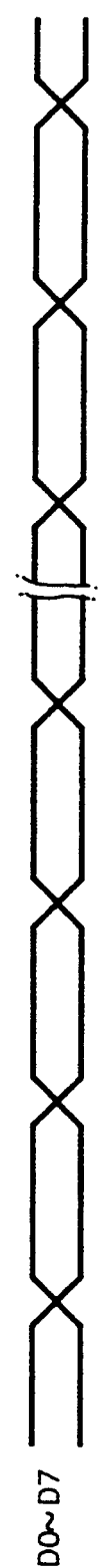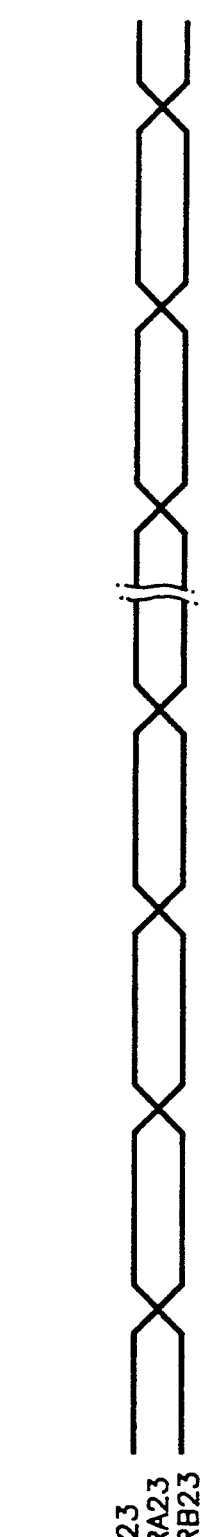
FIG.4a V.sync
FIG.4b S
FIG.4c /S
FIG.4d fs
FIG.4e fs
FIG.4f D0~D7
FIG.4g ADW0~ADW23
ADRA0~ADRA23
ADRB0~ADRB23

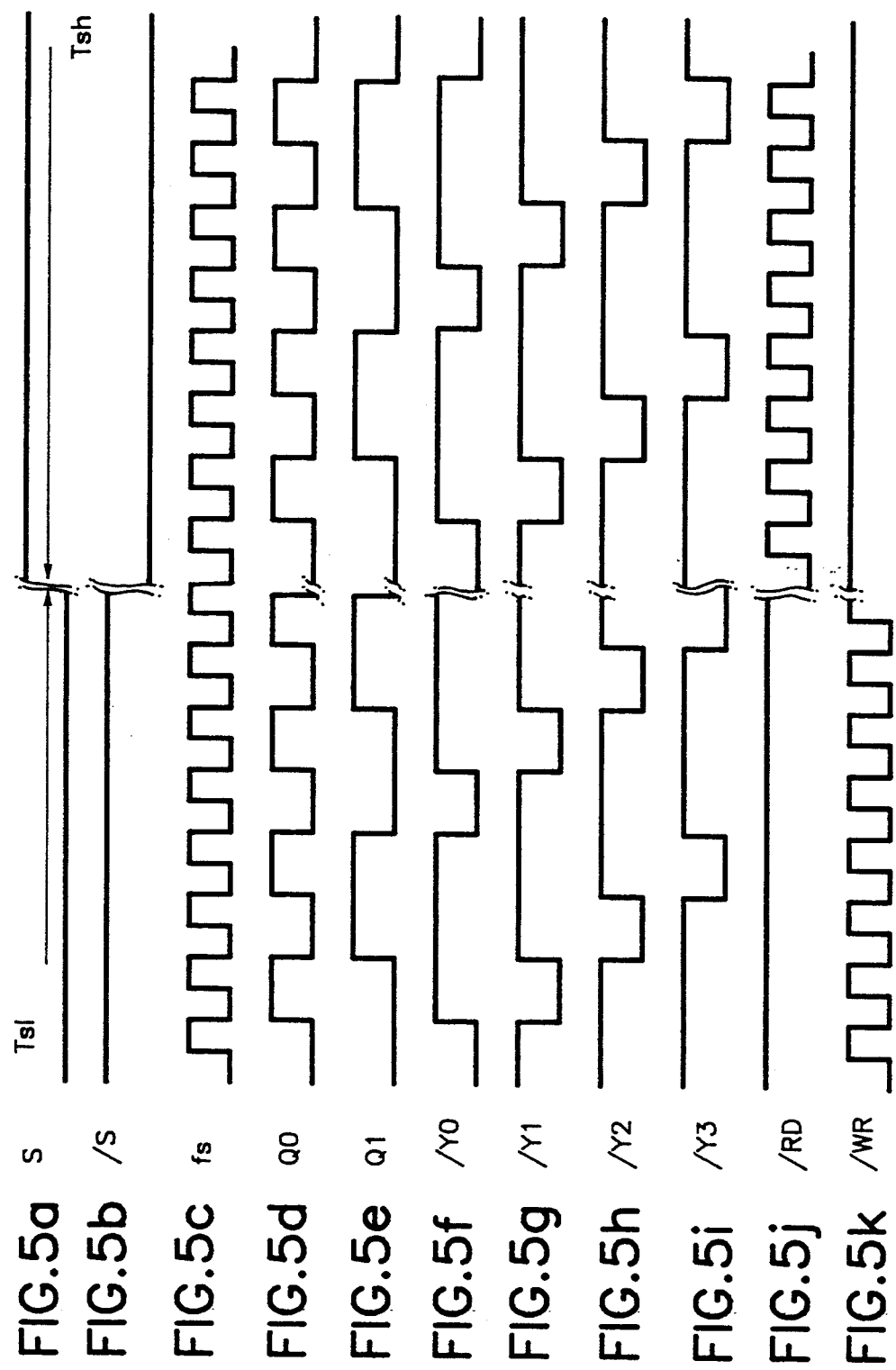

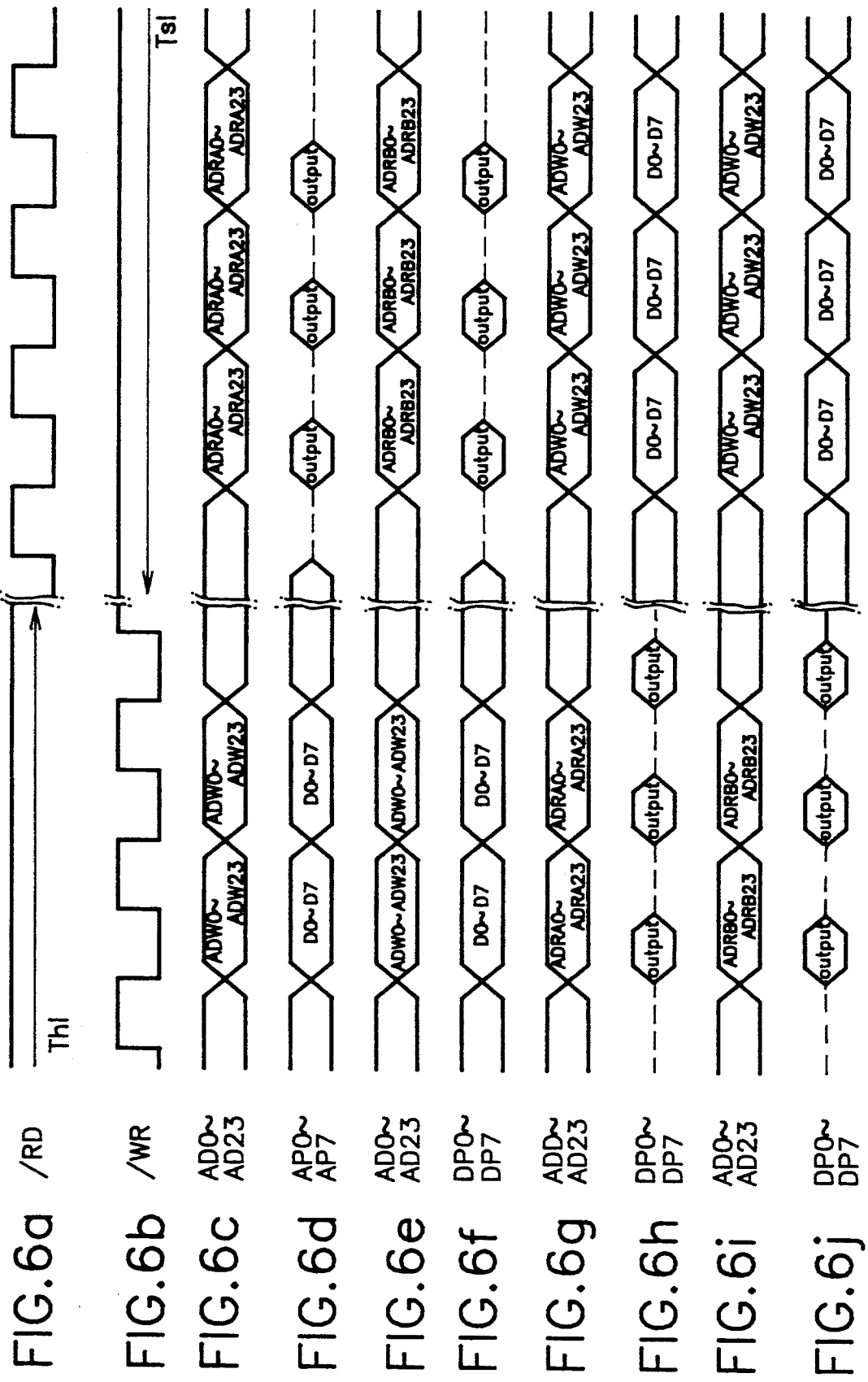

VIDEO SIGNAL COMPENSATION APPARATUS FOR TELEVISION RECEIVER

BACKGROUND OF THE INVENTION

Field of the Invention

This invention relates to a video signal compensation apparatus for a television receiver, more particurarly a video signal compensation apparatus for a television receiver having a screen vertical to horizontal ratio (hereinafter termed aspect ratio) of 9 to 16, (hereinafter 9:16) which is capable of receiving a television video signal having an aspect ratio of 3 to 4 (hereinafter 3:4) and interpolating the television video signal linearly so as to be suitable for an aspect ratio of 9:16, thereby enabling the prevention of distortion.

A video signal of the NTSC television broadcasting method has an aspect ratio of 3:4. On the other hand, the video signals of a projection television receiver and a high definition television receiver (Hereinafter, HDTV) have an aspect ratio of 9:16.

FIG. 1 is a block diagram representing the construction of a television receiver having an aspect ratio of 9:16 such as a projection television receiver and a HDTV receiver.

According to FIG. 1, the coventional television receiver comprises an intermediate frequency processing part 1 for converting a radio-frequency(RF) signal received through an antenna ANT into an intermediate frequency signal, a video signal detecting part 2 for detecting a video signal from the intermediate frequency signal, a video signal processing part 3 for processing the detected video signal to be displayable, a color picture tube (CPT) 4 for displaying the video signal processed to be displayable, a vertical deflection part 5 for performing the vertical deflection of the video signal to be displayed through the CPT 4, a horizontal deflection part 6 for performing the horizontal deflection of the video signal to be displayed through the CPT 4, an audio signal processing part 7 for detecting an audio signal from the intermediate frequency signal and then amplifying the detected audio signal with an established gain, a speaker 8 for generating sound in accordance with the audio signal output from the audio signal processing part (7).

The operation of the conventional television receiver having an aspect ratio of 9:16 with the above-mentioned construction will hereinafter be described.

Upon reception of a radio frequency signal through the antenna ANT, the radio frequency signal is converted into an intermediate frequency signal by the intermediate frequency processing part 1 and then inputted into a video signal detecting part 2 and an audio signal processing part 7, respectively.

In the video signal processing part 3, the video signal detected by the video signal detecting part 2 is converted into a displayable state through processes such as separation of a luminance signal Y and a chrominance signal c, demodulation of the chrominance signal, mixture and amplification. Thereafter, the processed video signal is applied to the CPT 4.

The vertical deflection part 5 and the horizontal deflection part 6 supply a deflection current to the CPT 4, so that the video signal can be displayed correctly on the CPT 4.

Then, a high voltage of the CPT 4 is supplied through the horizontal deflection part 6.

The audio signal processing part 7 detects an audio signal from intermediate frequency signal output from the intermediate frequency processing part 1 and then amplifies the audio signal with an established gain. Thereafter, the audio signal processing part 7 applies the amplified audio signal to the speaker 8.

However, the conventional television receiver having an aspect ratio of 9:16 has the following disadvantage. In that television receiver receives a video signal having an aspect ratio of 3:4 and then displays it, the video signal is displayed wider on the CPT 4 having an aspect ratio of 9:16, due to a difference of aspect ratio, thereby causing a distorted picture to be displayed.

SUMMARY OF THE INVENTION

Therefore, the present invention has been made in view of the above problem, and it is an object of the present invention to provide a video signal compensation apparatus for a television receiver having an aspect ratio of 9:16, which is capable of memorizing a received video signal having an aspect ratio of 3:4 in a memory unit, reading a line of the memorized video signal and interpolating the read line suitably for a display having an aspect ratio of 9:16 so as to display the video signal having a 3:4 aspect ratio on a CPT having a 9:16 aspect ratio, without any of picture.

According to an aspect of the present invention, a field signal output part outputs a first field signal and a second field signal having an opposite logic level to each other per each field section in accordance with a vertical synchronization signal for a video signal having a first aspect ratio.

An address counter inputs the vertical synchronization signal as a reset signal and an established sampling pulse as a clock signal and generates a write address for the video signal having the first aspect ratio.

An A/D converting part converts the received video signal having the first aspect ratio into a corresponding digital signal.

A read/write control part generates a read signal and a write signal, utilizing the first field signal, the second field signal and the sampling pulse.

A read address generating part generates a read address of a current line video signal and a different read address of a line video signal for a screen having a second aspect ratio, utilizing the write address output from the address counter.

An address switching part inputs the first field signal and the second field signal as a switching control signal and selectively passes the write address, the read address of the current line video signal and the subsequent read address of the line video signal.

In response to the read signal and the write signal which are inputted from the read/write control part and the read address and the write address which are inputted through the address switching part, a field memory part stores the video signal having the first aspect ratio inputted from the A/D converting part and simultaneously reads the stored video signal having the first aspect ratio line-by-line, line-by-line pixel-interpolates it suitably to the aspect screen ratio.

A data switching part inputs the first field signal and the second field signal as a switching control signal and outputs the pixel-interpolated video signal, line-by-line from the field memory part or inputs the video signal which has been outputted from the A/D converting part to the field memory part field-by-field.

A line compensation operation part interpolates the line video signals outputted from the data switching part line-by-line suitably to the second aspect ratio by performing an addition-operation with the line video signal.

An output part outputs the interpolated line video signals outputted from the line compensation operation part in an established order suitable to the second aspect ratio.

A D/A converting part converts the line video signals outputted the line compensation operation output part into corresponding analog signals.

BRIEF DESCRIPTION OF THE DRAWINGS

FIG. 4a through FIG. 4g are timing diagrams showing the operations of an address counter and an A/D converting part by a field signal output part in the video signal compensation apparatus of this invention;

FIG. 5a through FIG. 5k are timing diagrams showing the operations of an output part and a read/write control part by a field signal and a sampling pulse in the video signal compensation apparatus for a television receiver;

FIG. 6a through FIG. 6j are timing diagrams showing the read operation and the write operation of a field memory part by a read signal and a write signal from a read/write control part in the video signal compensation apparatus for television receiver;

DETAILED DESCRIPTION OF THE PREFERRED EMBODIMENT

Referring to FIG. 2 through FIG. 10, the video signal compensation apparatus and the operations of the apparatus will be hereinafter described. Referring to FIG. 2a and FIG. 2b, first, the compensation principles of a video signal in accordance with the present invention will be described.

Figure 1:
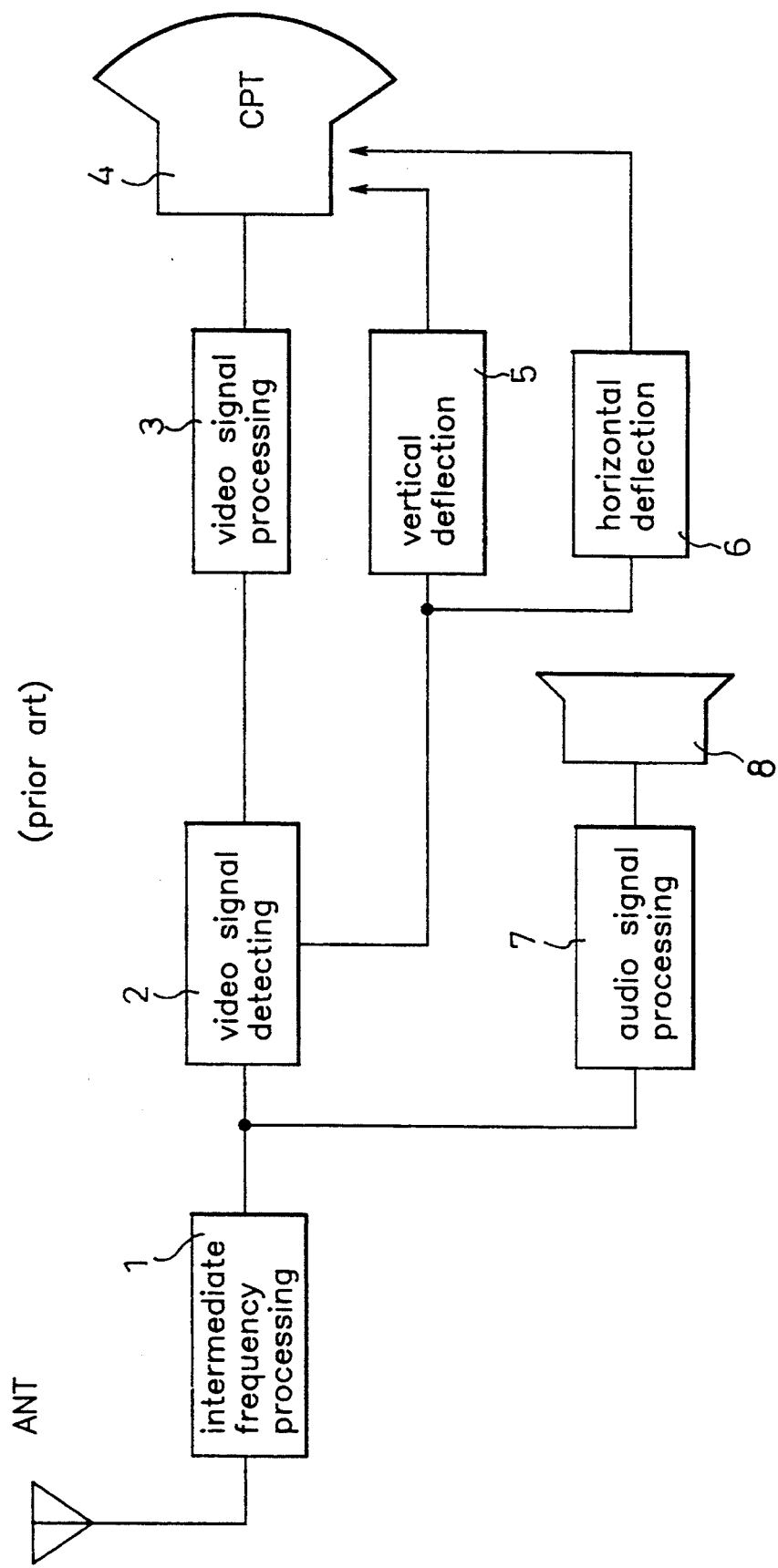
FIG. 1 is a block diagram of a conventional television receiver having ratio of 3 to 4.
Figure 2A:
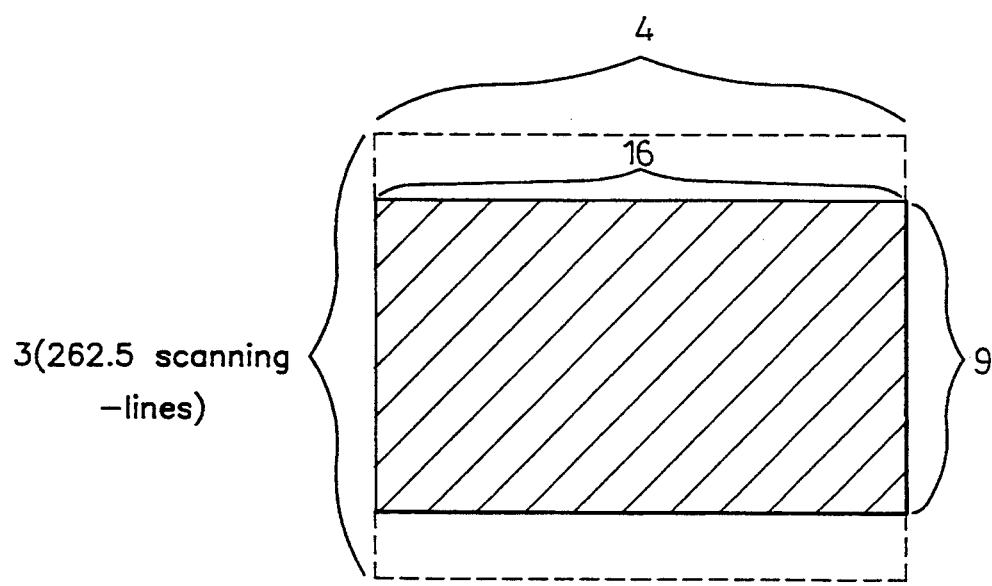
FIG. 2a is a explanatory diagram showing a screen perpendicular and horizontal ratio of 3 to 4 and an aspect ratio of 9:16.

FIG. 2a represents an aspect ratio of 3:4 and an aspect ratio of 9:16.

In the NTSC television method, because one field comprises 262.5 scanning lines 262.5×3/4; the scanning lines should be converted to 262.5 scanning lines in order display a video signal having a 3:4 aspect ratio on a CPT of a television (Hereinafter, TV) having a 9:16 aspect ratio.

Conventionally, the video signals corresponding to one screen are called a frame. One frame comprises two fields and a field comprises 262.5 lines. That is, one frame comprises 525 lines of in the NTSC television method.

As above mentioned, 3 scanning lines having a 3:4 aspect ratio are converted to 4 scanning lines suitable for a display screen having a aspect ratio, thereby enabling a video signal having a 3:4 screen aspect ratio to be displayed on a CPT having a 9:16 aspect ratio, without any distortion.

Figure 2B:
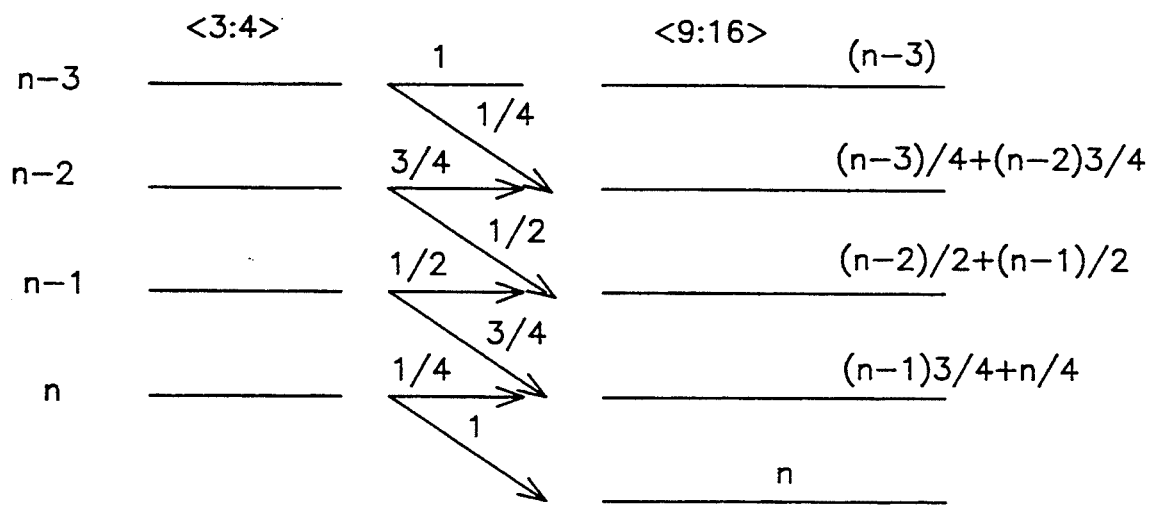
FIG. 2b is a explanation diagram showing the line interpolation principle of this invention.

FIG. 2b shows the principle of the present invention. According to FIG. 2b, ..., the n-3 line video signal, the n-2 line video signal, the n-1 line video signal and the line video signal on the CPT having a 3:4 aspect ratio are processed with an established addition operation so that ..., the n-3 line video signal, the $[(n-3)+3(n-2)]/4$ the line video signal the, $[(n-2)+(n-1)]/2$ line video signal, and the $[3(n-1)+n]4$ line video signal and line video signal can be displayed on a CPT having a 9:16 aspect ratio.

This line interpolation is to transform a video signal having a 3:4 aspect ratio suitably in the vertical direction for a CPT having 9:16 aspect ratio.

So as to convert a video signal having a 3:4 aspect ratio completely to a 9:16 aspect ratio, the video signal having the 3:4 screen aspect ratio should be interpolated not only in the vertical direction but also in the horizontal direction.

Figure 3:
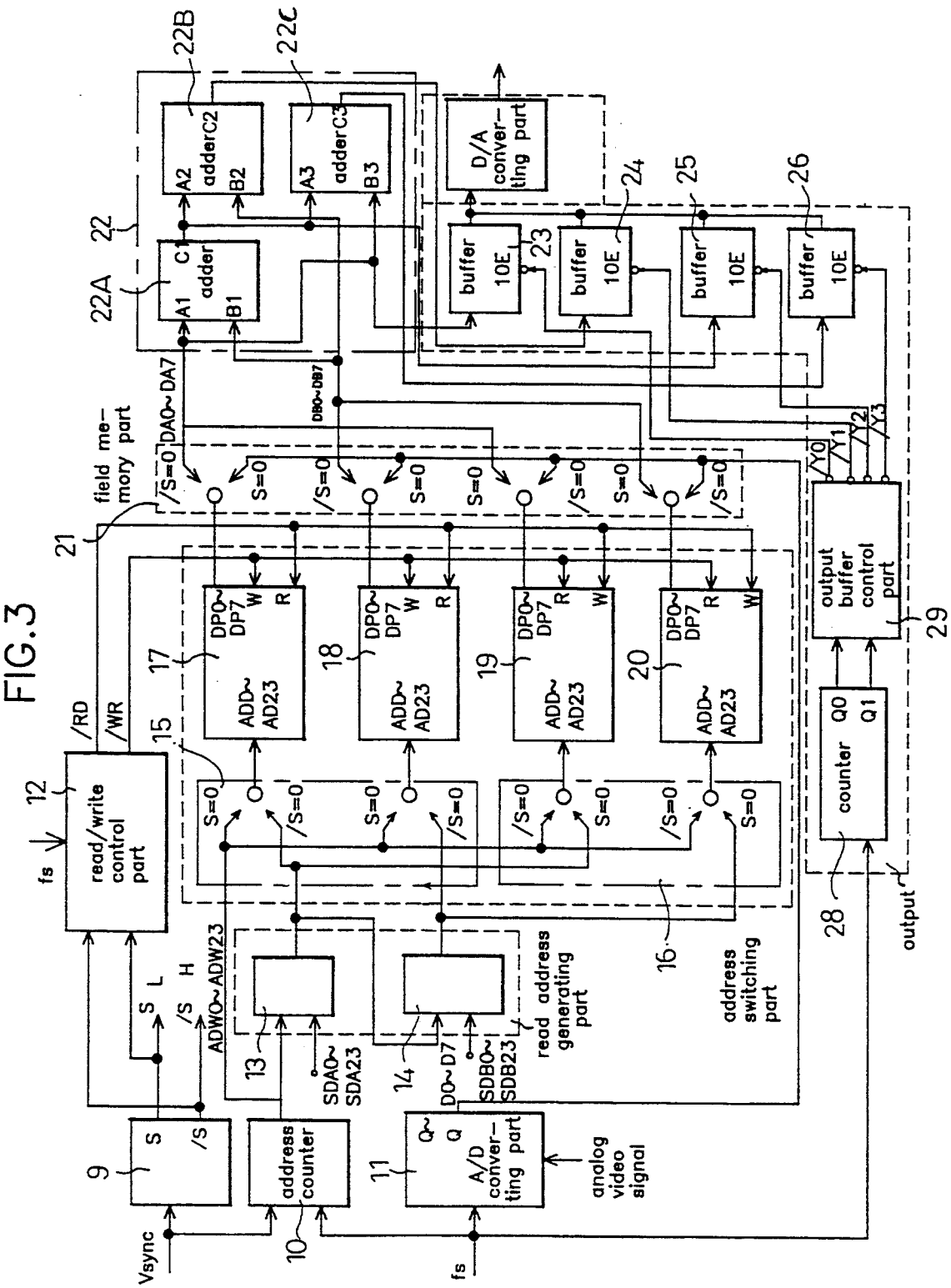
FIG. 3 is a block diagram of a video signal compensation apparatus for a television receiver in accordance with this invention.

Also so as to transform the video signal having a 3:4 aspect ratio to a CPT having a 9:16 aspect ratio, the video signal having 3:4 aspect ratio is read with a sampling rate different from that for the writing. This method is herein called pixel interpolation. Referring to FIG. 3, there is shown a block diagram of a video signal compensation apparatus for a television receiver which is capable of compensating the video signal having a 3:4 aspect ratio suitably to a television having 9:16 aspect ratio by performing the above line interpolation and pixel interpolation in accordance with the present invention.

As shown in this figure, the apparatus of the present invention comprises: a field signal output part 9 for receiving a vertical synchronization signal (Vsync) detected from a video signal having a 3:4 aspect ratio and generating a first field signal S and a second field signal /S having an opposite logic level to each other per each field, in response to the vertical synchorization signal an address counter 10 for obtaining the write address ADW0-ADW23 of a field memory part which is necessary for the writing and the reading of the video signal and which utilizes as inputs, the Vsync signal and a sampling pulse fs;

an A/D converting part 11 for converting the received analog video signal having a 3:4 aspect ratio into a corresponding digital signal;

a read/write control part 12 for generating a read signal /RD and a write signal /WR for the field memory, utilizing as inputs the first field signal /S, the second field signal and the sampling pulse fs, and for controlling the reading and the writing of the video signal with the read signal /RD and the write signal /WR;

two read address generating parts 13, 14 for generating the read addresses ADRA0-ADRA23 of a current line and the read addresses ADRB0-ADRB23 of the subsequent line, respectively, so as to read a video signal having a 3:4 aspect ratio written in field memory suitably for displaying 9:16 at an aspect ratio in accordance with the write addresses ADW0–ADW23 outputted from the address counter 10;

two address switching parts 15, 16 for selectively applying the write addresses ADW0–ADW23 from the address counter 10 and the read address ADRA0–ADRA23, ADRB0–ADRB23 from the read address generating parts 13, 14, respectively, to the field memories so as to write or read a video signal having a 3:4 aspect ratio in response to the first field signal S and the second field signal /S;

four field memories 17, 18, 19, 20 writing the video signal, field-by-field or by the unit of line for reading the video signal a having 3:4 aspect ratio outputted line-by-line from the A/D converting part 11 in response to the write address ADW-0–ADW23 and the read addressess ADRA0–ADRA23, ADRB0–ADRB23 which are inputted via the address switching parts 15, 16;

a data switching part 21 for selectively outputing a video signal stored in the field memories 17, 18, 19, 20 in response to the first field signal S and the second field signal /S;

a line compensation operation part 22 for performing an addition operation with the line video signal (having a 3:4 aspect ratio) which is selectively outputted from the field memories 17, 18, 19, 20 by the data switching part 21 so that it can be interpolated line-by-line, for a screen having a 9:16 aspect ratio;

four output buffers 23, 24, 25, 26 for outputting the interpolated line video signals, to a screen having a 9:16 aspect ratio by the line compensation operation part 22;

a D/A converting part 27 for converting the line video signals which are outputted from the output buffers 23, 24, 25, 26 into the corresponding digital signals;

a counter 28 for generating timing signals which control the output timings of the line video signals which are outputted from the output buffers 23, 24, 25, 26 utilizing the sampling pulse fs; and an output buffer control part 29 for decoding the timing signals and providing the decoded signals as output enable signals Y0, Y1 Y2, Y3 to the output buffers 23, 24, 25, 26.

As shown in FIG. 3, two read address generating sub-parts 13, 14 may be called a read address generating part as a general name. Two address switching sub-parts 15, 16 may also be called an address switching part as a general name. The output buffers 23, 24, 25, 26, the counter 28 the the output buffer control part 29 and the D/A converting part 27 may also be called an output part as a general name.

In FIG. 3, the items 22A, 22B, 22C are each an adder. Referring to FIG. 3 through FIG. 6, the operations of the video signal compensation apparatus for a television receiver in accordance with the present invention will be hereinafter described.

If the vertical synchronization signal (Vsync) (FIG. 4a) is inputted to the field signal output part 9 of FIG. 3, the field signal output part 9 generates the first field signal S and the second field signal /S (s and /s have opposite levels to each other) at each falling edge of the Vsync signal in response to the Vsync (FIG. 4b, FIG. 4c), and simultaneously supplies s and /s to the read/write control part 12, the address switching part 15, 16 and the data switching part 21.

On the other hand, if the sampling pulse fs in inputted to the A/D converting part 11, the A/D converting part 11 acts to convert the inputted analog video signal into the corresponding digital signal D0–D7 (FIG. 4f) having a 3:4 aspect ratio.

The digital signals D0–D7 are selectively supplied to the data port DP0–DP7 of the field memories 17, 18 or the field memories 19, 20 in accordance with the operation of the data switching part 21.

The sampling pulse fs is also supplied to the address counter 10 as a clock signal and is counted therein. The count result is outputted as the write addresses ADW-0–ADW23 and selectively supplied to the address ports AD0–AD23 of the field memories 17, 18 or the field memories 19, 20 in accordance with the operations of the address switching parts 15, 16.

The output signal is also supplied to the read address generation parts 13, 14 together with the address switching parts 15, 16 . The read address generating part 13 acts to add the inputted write addressess ADW-0–ADW23 to the first offset addresses SDA0–SDA23 for designating a region corresponding to the aspect having 9:16 screen ratio of a current line and to supply the addition result to the address ports AD0–AD23 of the field memories 17, 19 as the first read addresses ADRA0–ADRA23, via the address switching parts 15, 16.

On the other hand, the read address generating part 14 acts to add the first read addressess (ADRA0–ADRA23) to the second offset addresses SDB0–SDB23 (for designating a region corresponding to the screen having a 9:16 screen ratio of a subsequent line and to supply the result to the address ports AD0–AD23 of the field memories 18, 20 as the second read addresses ADRB0–ADRB23 via the address switching parts 15, 16.

FIG. 4g shows the output timings of the above addressess.

On the other hand, the read/write control part 12 generates the data read signal /RD and the data write signal /WR with the timings shown in FIG. 5a, 5b and FIG. 5j, 5k in correspondence to the low interval TSL and the high interval TSH of the inputted first field signal S and the inputted second field signal /S, and provides them to the field memories 17, 18, 19, 20.

Accordingly, while the first field signal S is in a low state (s="0": TSL) as shown in FIG. 6a, the addresses switching parts 15, 16 are switched to the terminal of S=0 and the write address ADW0–ADW23 are supplied to the field memories 17, 18 via the terminal of S=0.

Also the first read addresses ADRA0–ADRA23 and the second read addresses ADRB0–ADRB23 are applied to the field memory 19 and the field memory 20, respectively, as shown in FIG. 6g and FIG. 6i because the address switching parts 15, 16 are switched to the terminal S=0, and the video signal having 3:4 aspect ratio is outputted from the data ports DP0–DP7 of the field memories 19, 20 as shown in FIG. 6h and FIG. 6j because the data switching part (21) is switched to the terminal S=0.

That is, while the first field signal S is in the low state, the write signal /WR ( FIG. 6b) is applied to the write control terminal W of the field memories 17, 18 and simultaneously to the read control terminal R of the field memories 19, 20, thereby to write the video signal in the field memories 17, 18 and to read a video signal from the field memories 19, 20.

On the other hand, while the second field signal /S is in a low state TSH, the data read signal /RD from the read/write control part 12 is applied to the read control terminal R of the field memories 17, 18 and simultaneously to the write control terminal W of the field memories 19, 20.

At this time, since the address switching parts 15, 16 and the data switching part 21 are switched to the terminal /S=0, the write addresses ADWo-ADW23 are supplied to the field memories 19, 20 and the first read addresses ADRA0-ADRA23 and the second read addresses ADRB0-ADRB23 are supplied to the field memories 17, 18 respectively, thereby to write a video signals D0-D7 in the field memories 19, 20 and to read a video signals DA0-DA7, DB0-DB7, respectively, from the field memories 17, 18.

Herein, the read addresses have more addressess than the write addresses such that a video signal having a 3:4 aspect ratio can be read line-by-line and simultaneously be pixel-interpolated suitably to 9:16 aspect ratio.

The video signals DA0-DA7, DB0-DB7 outputted from the field memories 17, 18 or the field memories 19, 20 are applied to the line compensation operation part 22.

The first adder 22A performs an addition-operation of C1=(A2/2)+(B1/2) and then supplies the addition result to an input terminal A2 of the second adder 22B and the output buffer 25 and simultaneously to an input terminal A3 of the third adder 23C.

The second adder 22B also performs a similar addition operation of C2=(A2/2)+(B2/2) and then supplies addition result C2=(A1+3B1)/4 to the output buffer 24 via the output terminal C2 thereof.

The third adder 22c also performs an addition-operation of C3=(A3/2)+(B3/2) and then supplies the addition result C3=(3A1+B1)/4 to the output buffer 26 via the output terminal C3 thereof.

On the other hand, a video signal DA0-DA7 which are supplied from the field memories 17, 19 to the input terminal A1 of the first adder 22A are simultaneously applied to the output buffer 23.

Therefore, a video signals which are outputted respectively from the output buffers 23, 24, 25, 26 are A,(A1+3B1)/4, (A1+B1)2, (3A1+B1)/4 which thus are interpolated suitably for a 9:16 aspect ratio.

The video signals which are outputted from the output buffers 23, 24, 25, 26 are converted into the original analog video signals via the D/A converting part 27 and then outputted.

At this time, the output buffers 23, 24, 25, 26 are controlled by the counter 28 and the output buffer control part 29.

That is, the counter 28 counts the sampling pulse fs as shown in FIG. 5c and then outputs the count pulses of FIG. 5e and FIG. 5f obtained as the count result via the output terminals Q0, Q1.

The output buffer control part 29 decodes the count pulses as shown in FIG. 5f and FIG. 5i and then applies the decoded pulses as the buffer output enable signals /Y0, /Y1, /Y2, /Y3 to the terminal /OE of the output buffers 23, 24, 25, 26 as via the output terminals Y0, Y1, Y2, Y3.

Therefore, the output buffers 23, 24, 25, 26 output the interpolated line video signals in an estabished order in accordance with the buffer output enable signals /Y0, /Y1, /Y2, /Y3.

Figure 7:
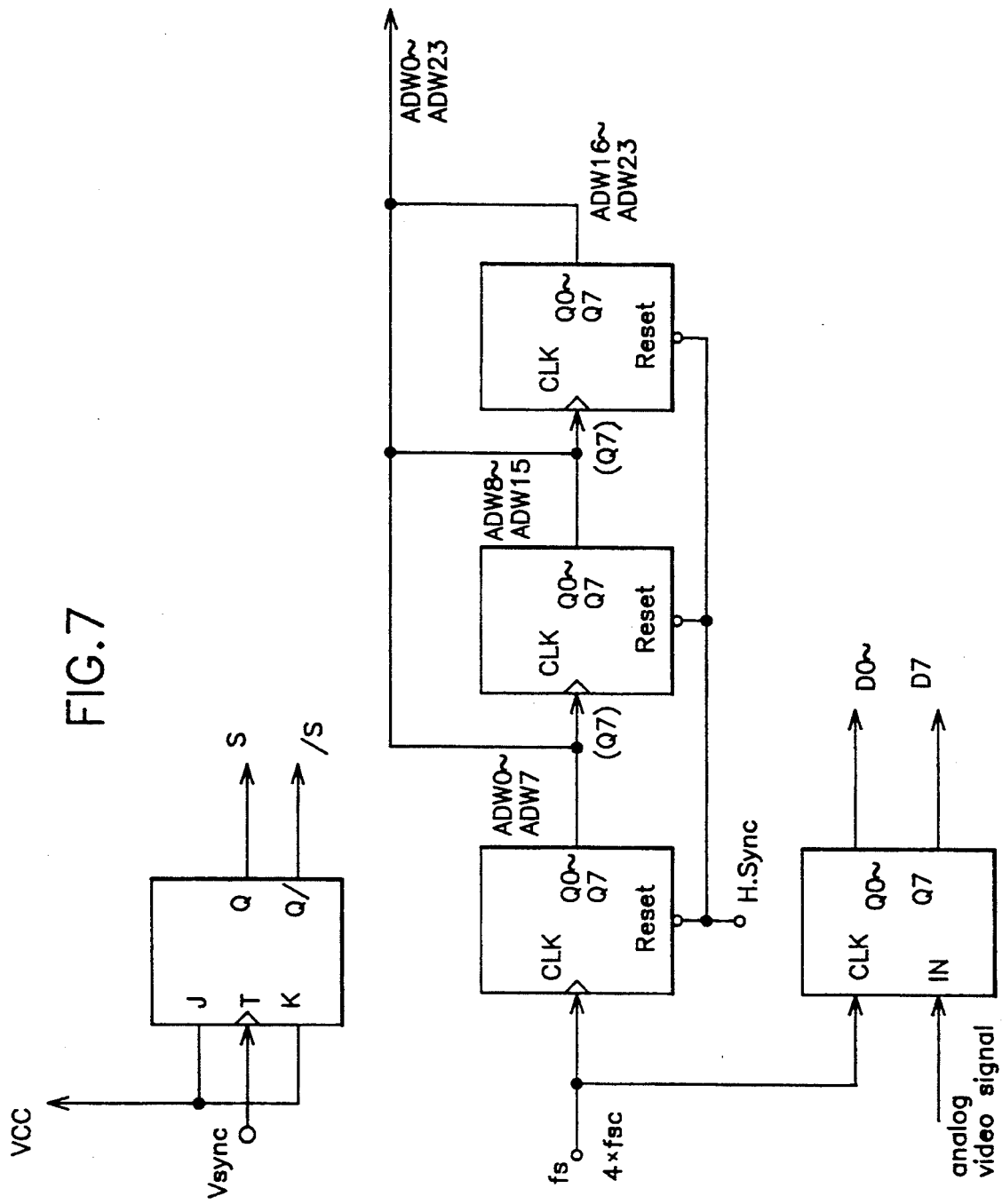
FIG. 7 is a detailed circuit diagram of a field signal output part, an address counter, and an A/D converting part in the apparatus of FIG. 3.

FIG. 7 is a detailed circuit of the field signal output part 9, the address counter 10 and the A/D converting part 11 in FIG. 3.

In FIG. 7, the field signal output part 9 is comprised of a JK flip-flop, which outputs the first field signal S and the second field signal /S from the non-inverting output terminal Q and the inverting output terminal /Q thereof in accordance with the vertical synchronization signal Vsync which is supplied to the clock signal input terminal T.

In FIG. 7, the address counter 10 is comprised of three binary counters 10A, 10B, 10C for outputting 8 bits, which input the Vsync as a reset signal.

Therefore, the counters 10A, 10B, 10C are reset per each field and then perform a count operation utilizing the sampling pulse fs as a clock signal, thereby to make the write addresses ADW0-ADW23 of 24 bits.

The A/D converting part 11 converts the inputted analog video signal into the digital signal of 8 bits D0-D7 and then outputs the digital signal via the output terminal Q0-Q7 thereof.

Figure 8:
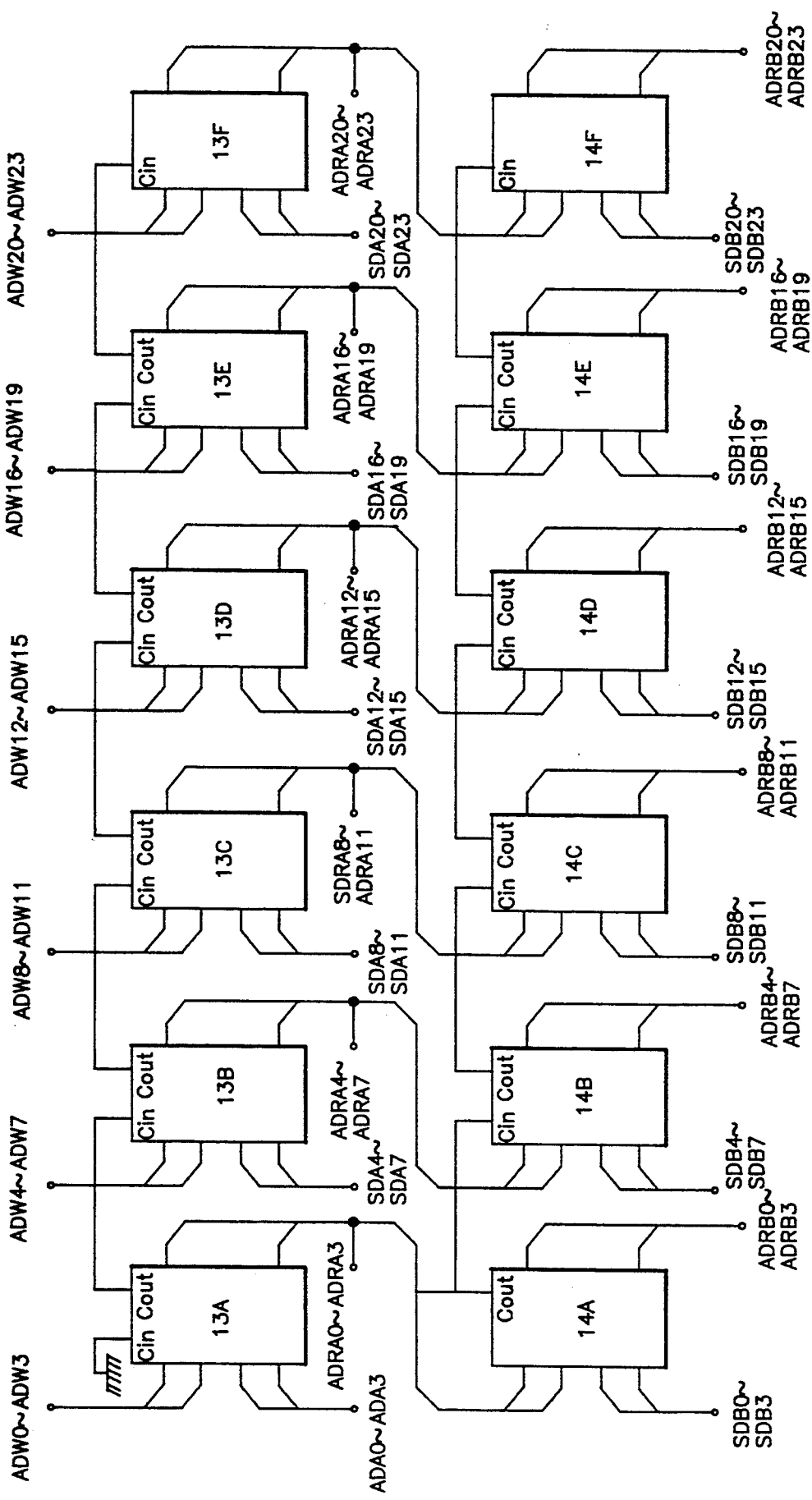
FIG. 8 is a detailed circuit diagram of a read address generating part in the apparatus of FIG. 3.

FIG. 8 is a detailed circuit of the read address generating parts 13, 14. As shown in this drawing, the read address generating part 13 is comprised of six addresses 13A-13F which generates the first read addresses ADRA0-ADRA23 by adding the first offset addresses SDA0-SDA23 to the write addresses ADW0-ADW23, respectively, by the unit of 4 bits.

Also the read address generating part 14 is comprised of six adders 14A-14F which generate the second read addresses ADRB0-ADRB23 by adding the first read addresses of ADRA0-ADRA23 from the adders 13A-13F to the second offset addresses SDB0-SDB23, respectively.

In FIG. 8, each of adders 13A-13F, 14A-14F supplies a carry output signal Cout which is outputted from an adder of low order bit to an adder of high order bit as a carry input signal Cin, thereby to make the first read addresses ADRA0-ADRA23 and the second read addresses ADRB0-ADRB23 of 24 bits.

Figure 9:
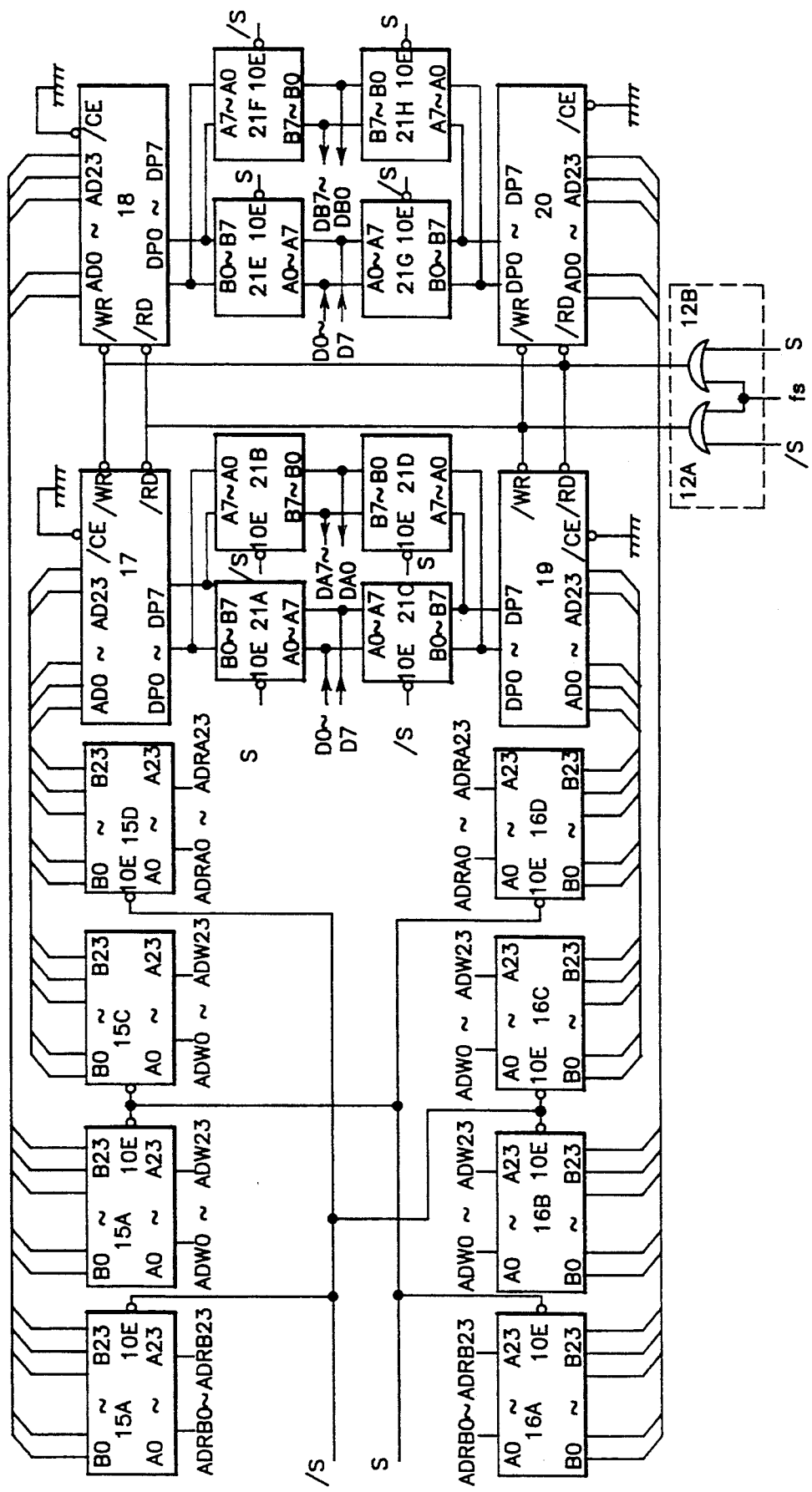
FIG. 9 is a detailed circuit diagram of a field memory part, a data switching part and an address switching part in the apparatus of FIG. 3.

FIG. 9 is a peripheral circuit of the field memories 17, 18, 19, 20. In FIG. 9, the address switching parts 15 is comprised of four tri-state buffers 15A-15D which input the first field signal S and the second field signal /S as an output enable signal via the output enable terminal /OE thereof.

Also the address switching part 16 is comprised of four tri-state buffers 16A-16D which input the first field signal S and the second field signal /S as an output enable signal via the output enable terminal /OE thereof.

Therefore, if the first field signal S switches to a low state, the tri-state buffers 15B, 15C in the address switching part 15 switches to an enable state, thereby to supply the write addresses ADW0-ADW23 which are supplied via the input terminal AO to the address ports AD0-AD23 of the field memories 17, 18 via the output terminal B0-B23.

Also, the tri-state buffers 16A, 16D in the address switching part 16 switch to an enable state, thereby to supply the second read address ADRB0-ADRB23 to the address ports AD0-AD23 of the field memory 20 and to supply the first read addresses ADRA0-ADRA23 to the address ports AD0-AD23 of the field memory 19.

On the other hand, if the second field signal /S switches to a low state, the tri-state buffers 15A, 15D in the address switching part 15 switches to an enable state, thereby to supply the first read addresses ADRA0–ADRA23 to the field memory 17 and to supply the second addresses ADRB0–ADRB23 to the field memory 18.

Also, the tri-state buffers 16B, 16C in the address switching part 16 switch to an enable state, thereby to write the address ADW0–ADW23 to the field memories 19, 20.

On the other hand, the data switching part 21 is comprised of eight tri-state buffers 21A–21H which are controlled by the first field signal S and the second field signal /S.

Therefore, if the first field signal S switches to a low state, the tri-state buffers 21A, 21D, 21E, 21H switch to an enable state, thereby to supply the video signals D0–D7 to the field memory 17, to output the video signals DA0–DA7 from the field memory 19, to supply the video signals D0–D7 to the field memory 18, and to output a video signals DB0–DB7 from the field memory 20.

If the second field signal /S switches to a low state, the tri-state buffers 21B, 21C, 21F, 21G switches to an enable state, thereby to output the video signals DA0–DA7 from the field memory 17, to supply a video signals D0–D7 to the field memory 19, to output a video signals DB0–DB7 from the field memory 18, and to supply a video signals D0–D7 to the field memory 20.

The read/write control part 12 is comprised of a first OR gate 12A which inputs the sampling pulse fs and the first field signal S and a second OR gate 12B which inputs the sampling pulse fs and the second field signal /S, thereby to output the read signal /RD and the write signal /WR as shown in FIG. 5a, FIG. 5b, FIG. 5c, FIG. 5j and FIG. 5k.

As hereinbefore described, a video signal having a 3:4 aspect ratio which is inputted to a television receiver having 9:16 aspect ratio is written with a field-by-field write address by a memory in the television receiver and then a video signal which is stored in the memory is read line-by-line with more read addresses than write addresses, thereby enabling the pixel-interpolation and the line interpolation of the video signal having a 3:4 aspect ratio to that of a 9:16 aspect ratio.

As above mentioned, since a video signal having a 3:4 aspect ratio is converted to a 9:16 aspect ratio suitable for a television receiver having a 9:16 aspect ratio, users can watch the picture without any distortion of the picture.

What is claimed is:

1. A video signal compensation apparatus for a television receiver, comprising:
    field signal output means for generating two field signals which have opposite logic levels per each field, in response to a vertical synchronization signal of a received analog video signal which has a first aspect ratio;
    address counter means for generating a write address for the writing of a video signal, utilizing said vertical synchronization signal and a system sampling pulse;
    A/D converting means for converting the received analog video signal into a digital video signal, utilizing the sampling pulse;
    read/write control means for generating a read signal and a write signal for memorization, utilizing the two field signals and the system sampling pulse;
    read address generating means for generating a read address, line-by-line, which is suitable for a second aspect ratio, utilizing the write address;
    address switching means for selectively passing the write address and the read address, in response to said two field signals;
    field memory means for storing the digital video signal field-by-field and for reading the stored video signal line-by-line, thereby pixel-interpolating the stored digital video signal;
    data switching means for outputting the pixel-interpolated interpolated digital video signal from the field memory means, line-by-line, or inputting the digital video signal from the A/D converting means to the field memory means, field-by-field, in response to said two field signals;
    line compensation-operation means for performing an addition operation with a video signal which is inputted line-by-line via the data switching means, thereby to line-interpolate a video signal suitably to the second aspect ratio; and
    output means for outputting the line video signals from the line compensation-operation means in an established order which is suitable to the second aspect ratio.

2. A video signal compensation apparatus for a television receiver as set forth in claim 1, wherein said output means includes:
    a plurality of output buffers for inputting, buffering, and outputting the line video signals from the line compensation-operation means;
    a counter for providing a timing signal by counting the system sampling pulse;
    output buffer control means for providing an output enable signal to the plurality of output buffers by decoding the timing signal; and
    additional D/A converting means for converting the line digital video signals which are outputted in order from the plurality of output buffers into corresponding line analog signals.

3. A video signal compensation apparatus for a television receiver as set forth in claim 1, wherein said read address generating means includes:
    a plurality of bit adders for adding first offset addressess which are inputted to designate a region corresponding the second screen aspect ratio to the write addressess, respectively, from the address counter and then outputting the addition result as first read addressess of a current line; and,
    a plurality of bit adders for adding second offset addressess which are inputted to designate a region corresponding to the second screen aspect ratio to the first read addresses, respectively, and then outputting the addition result as second read addressess corresponding to the line subsequent to the current line.

4. A video signal compensation apparatus for a television receiver as set forth in claim 1, wherein said address switching means and said data switching means include a plurality of tri-state buffers which are switched in response to said two field signals, respectively.

5. A video signal compensation apparatus for a television receiver as set forth in claim 1, wherein said line compensation-operation means includes a plurality of adders for making a plurality of line video signals which are suitable to the second aspect ratio, by performing an addition operation with a plurality of line video signals having the first aspect ratio which are inputted via the data switching means.

6. A video signal compensation apparatus for a television receiver as set forth in claim 5, wherein the number of the line video signals having the first aspect ratio is n (a positive integer) and the number of the line video signals having the second screen aspect ratio is n+1.

7. A video signal compensation apparatus for a television receiver as set forth in claim 1, wherein said first screen aspect ratio is 3:4 and said second screen aspect ratio is 9:16.

8. A video signal compensation apparatus for a television receiver as set forth in claim 1, wherein said video signal having the first screen aspect ratio is an NTSC broadcasting video signal.

9. A video signal compensation apparatus for a television receiver as set forth in claim 1, wherein said read/write control means includes a first OR gate for inputting the first field signal and the system sampling pulse; and a second OR gate for inputting the second field signal and the system sampling pulse.

10. A video signal compensation apparatus for a television receiver as set forth in claim 1, wherein said address counter includes a plurality of binary courters which uses the vertical synchronization signal of the received video signal having the first screen perpendicular and horizontal ratio as a reset signal and uses the system sampling pulse as a clock signal.

11. A video signal compensation apparatus for television receiver, as set forth in claim 1, wherein said field signal output part includes a JK flip-flop which outputs a first field signal and a second field signal having opposite logic levels, in response to the vertical synchronization signal.

12. A video signal compensation apparatus for television a receiver as set forth in claim 1, wherein said line compensation-operation means converts every three consecutive lines of input into four consecutive lines of output by linear interpolation of the input pixel data therein as follows:

the first line of output is formed so as to have its pixel data coincide with a first line (line n-3) of input;

the next line of output is formed so as to have its pixel data weighted as (1/4) said first input line (line n-3) plus (3/4) of the next input line (line n-2);

the next line of output is formed so as to have its pixel data weighted as (1/2) input line n-2 plus (1/2) the next input line (line n-1);

the next line of output is formed so as to have its pixel data weighted as (3/4) input line n-1 plus (1/4) the next input line (line n), where n is a positive integer, to thereby alter the aspect ratio of the video input signal to a second aspect ratio output signal.

13. A video signal compensation apparatus for a television receiver as set forth in claim 1, wherein said the television receiver having the second aspect ratio is a High Definition TV (HDTV).

* * * * *